March 10, 1936.    C. A. CAMPBELL    2,033,229
AIR BRAKE
Filed July 27, 1932    2 Sheets-Sheet 2

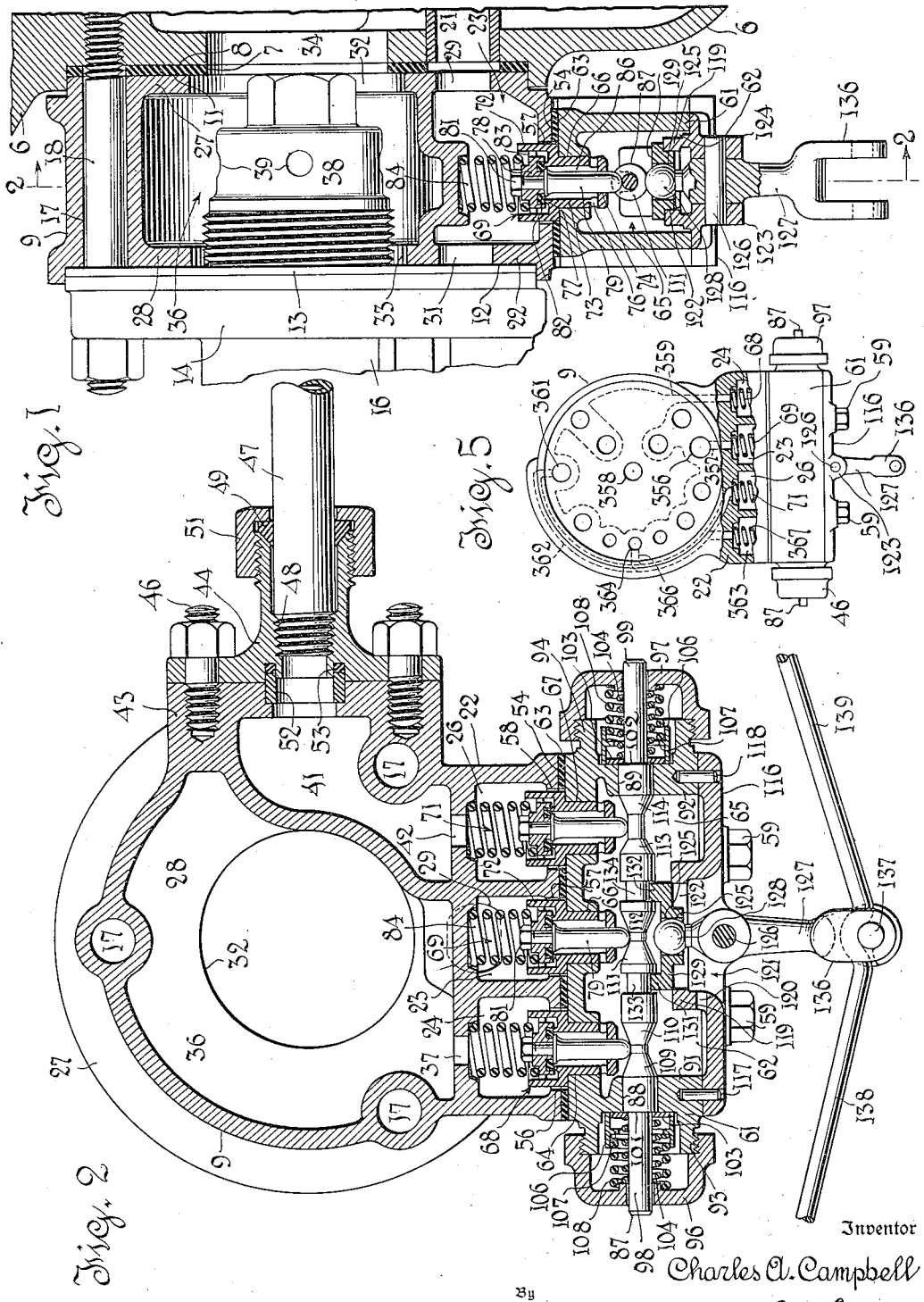

Inventor
Charles A. Campbell
By Dodge and Son
Attorneys

Patented Mar. 10, 1936

2,033,229

UNITED STATES PATENT OFFICE 2,033,229

AIR BRAKE

Charles A. Campbell, Watertown, N. Y., assignor to The New York Air Brake Company, a corporation of New Jersey Application July 27, 1932, Serial No. 625,096

21 Claims. (Cl. 303—80)

The present invention relates to air brakes, and particularly to release valve means therefor.

In the K type freight brake there are closely related a triple valve, an auxiliary reservoir, and a brake cylinder, the triple valve functioning to admit air to and exhaust air from the brake cylinder, to charge the auxiliary reservoir from the brake pipe during release, and to admit air from the auxiliary reservoir to the brake cylinder during service and emergency applications. In this particular type of brake it has been found that one reservoir volume is sufficient to provide pressure fluid used in the brake cylinders.

In the present specification, the term "triple valve" will be used in a very broad sense to include mechanism of this general character, whether it be strictly a conventional triple valve or not.

Mounted on top of the auxiliary reservoir volume is a hand-operated release valve for the purpose of venting air from the auxiliary reservoir when the valve is opened from the side of the car. Upon release of the manually operated lever or pull rod for the release valve, the valve closes and prevents further escape of auxiliary reservoir air to the atmosphere.

When the air brake system is fully charged and the train is pulling out of the terminal, it is often noted that some of the brakes in the train are partially applied, sometimes because of a reapplication following an overcharge of the auxiliary reservoir, and more often, because of the failure of the brake to release following a previous application. The number of brakes thus held applied in the train is so small in some cases that with modern locomotives, no appreciable effort is exerted in pulling these cars, even though the wheels slide. The brakemen are instructed to watch carefully the different cars when the train is pulling out, so as to note that no brakes remain applied. If one is noted in this condition, the operator pulls the release valve pull rod to open the release valve partially and thereby cause a slight reduction in the auxiliary reservoir pressure. As a result, the higher brake pipe pressure on the outer face of the triple valve piston forces the piston inwardly to release position, thereby opening the brake cylinder exhaust cavity and allowing the brake to release promptly.

Invariably the operator holds the release valve open for too long a period, this resulting in a needless waste of auxiliary reservoir air, since it is only necessary to release sufficient air from the auxiliary reservoir to insure movement of the triple valve to release position. Frequently, this faulty operation by the brakeman results in the release of so much air from the auxiliary reservoir that, with the well known K type triple valve, the triple valve functions to move to retarded release position. In this position the exhaust of brake cylinder air is at an extremely slow rate, thereby preventing prompt release of the brakes.

Also, in switching service, it is customary, when the cars are set out of a train, first to completely drain the brake pipe of air when uncoupling the cars. After this, the brakeman pulls the release valve pull rod and exhausts air from the auxiliary reservoir. However, due to the triple valve having moved to emergency position when the brake pipe pressure is completely depleted, the triple valve piston and slide valve assume a position known as emergency lap in their backward travel toward release position, when the auxiliary reservoir pressure is bled down to a certain point which, from actual experience, has been shown to be between five and six pounds.

In the present type K equipment, use of a new large capacity release valve on the auxiliary reservoir has introduced an undesirable condition. With this large capacity release valve, the auxiliary reservoir air may be exhausted to the atmosphere through the release valve at a rate faster than that at which the air can recede from the brake cylinder to the auxiliary reservoir through the brake cylinder port. As a result, a certain amount of air is trapped in the brake cylinder which is sufficient to hold the brake shoes against the wheels tightly enough to prevent free and convenient movement of the vehicles. In effecting the aforementioned pressure release, the air is drawn from the brake cylinder into the auxiliary reservoir and exhausted therefrom through the auxiliary reservoir release valve, there being no release valve provided on the brake cylinder volume.

On single reservoir air brake equipment, the trapping of pressure fluid in the brake cylinder referred to is objectionable, but has not introduced any serious complications because this defect may be overcome by re-dimensioning some of the internal parts of the triple valve. However, in air brake equipment which utilizes more than one reservoir volume, it is necessary to provide a release valve or drain cock on each reservoir volume, so that all of the volumes may be released before a movement of the vehicle may be accomplished. The use of cut-out cocks on air brake system reservoirs, such as those used in combination with triple valve structures, is often the cause of serious leakages on the auxiliary reservoir side of the triple valve sufficient to cause defective functioning of the valve. Also, car operators frequently do not open all of the drain cocks, with the result that air trapped in one or more of the storage reservoirs is sufficient to cause improper functioning of the valve.

It will be noted that particular mention has been made that, in the systems referred to, no release valve is mounted directly on the brake cylinder volume. It will be understood, however, that it is of the utmost importance that pressure fluid be released completely from this volume before any movement of the vehicle may take place.

It is the primary object of this invention to provide release valve means which, when operated, insure exhausting of pressure fluid from the brake cylinder volume so as to preclude all possibility of the brakes remaining either wholly or partially applied at the time of release.

One feature of the invention involves direct venting of the brake cylinder to the atmosphere at the same time the auxiliary reservoir is being reduced.

A further object is to provide for prompt release of the brakes, even though the brakeman holds the release valve on the auxiliary reservoir open long enough to permit the triple valve to move to retarded release position.

The invention contemplates the utilization of manually operable, common actuating means for release valve means controlling vents leading to the atmosphere both from the brake cylinder volume and from one or more reservoir volumes. The actuating means are designed so that they may be operated to open selectively, serially, or simultaneously the vents leading from the several working volumes and thereby secure the desired venting action.

Variable resistance means associated with the actuating means serve to indicate definitely to the operator the open or closed condition of the respective vents at any given point in the movement of the actuating means. The resistance means mentioned also serve to return the actuating means automatically to normal position in which all of the vents are closed. Provision for operation from either side of the car is also a feature of the device.

Several practical embodiments of the invention are illustrated in the accompanying drawings, in which:

Fig. 1 is a view partly in side elevation and partly in vertical, axial section, showing my invention applied to a filler piece mounted between an auxiliary reservoir of the standard freight type and a triple valve of the two-reservoir type, the vent valve for the brake cylinder volume (the only vent valve shown in this view) appearing in normal, closed position;

Fig. 2 is a section on line 2—2 of Fig. 1 with the triple valve removed and the filler piece shown provided with a supplemental reservoir connection, the poppet-type vent valves for the brake cylinder, auxiliary reservoir, and supplemental reservoir volumes all appearing in normal, closed position, and the common actuating means therefor in its corresponding position;

Figure 4:
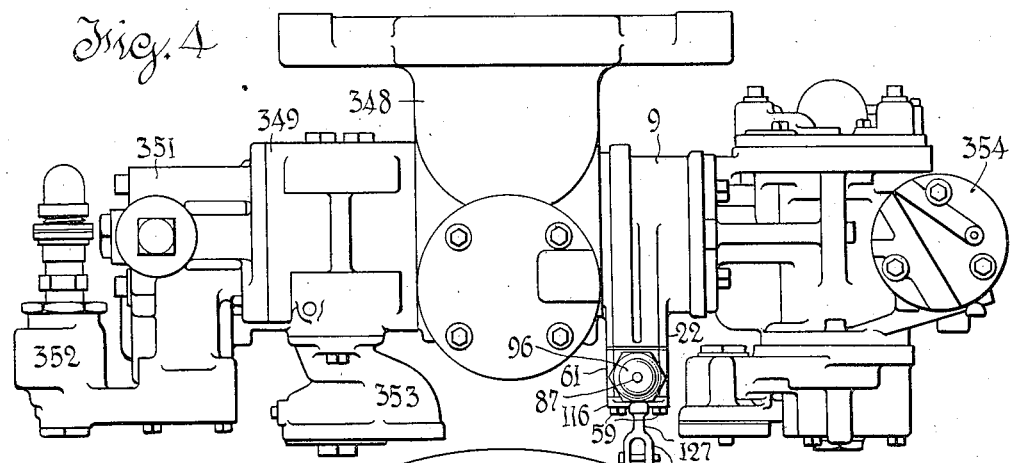

Fig. 4 is a side elevation of the well known passenger type triple valve, referred to as the U-12-B, showing a filler piece and release valve device of the general type of Figs. 1 and 2 applied thereto; and Fig. 5 is an end elevation, looking to the left relatively to Fig. 4, of the filler piece and release valve device of Fig. 4 removed from the triple valve assembly, a portion of the filler piece being broken away to show the several vent valve recesses for the brake cylinder, auxiliary reservoir, emergency reservoir, and service reservoir volumes.

In the arrangement shown in Figs. 1 and 2 of the drawings, 6 represents the auxiliary reservoir. This reservoir is provided with a recessed seat 7 having a ported gasket 8 thereon. A filler piece 9 having a mating face 11 to register with seating face 7 is mounted on this face and offers a similar recessed face 12 for the gasket 13 and the mounting flange 14 of the triple valve proper designated by the numeral 16.

Filler piece 9, which is suitably chambered and ported, serves, as appears more fully later, to connect the supplemental reservoir, the auxiliary reservoir and the brake cylinder pipe to the triple valve. Since the general construction of this filler piece is fully covered by my prior application Serial No. 567,698, filed October 8, 1931 (Patent No. 1,871,210 dated August 9, 1932), claim is made herein to the filler piece only in combination with my improved release valve means.

Extending through auxiliary reservoir 6 is the brake cylinder pipe 21 which leads to the brake cylinder (not shown). Filler piece 9 is provided with a depending, hollow portion 22 in which, as shown in Fig. 2, are formed three separate chambers, namely, a brake cylinder chamber 23, an auxiliary chamber 24, and a supplemental reservoir chamber 26. All three of these chambers extend between the annular face flanges 27, 28 of the filler block, as shown in Fig. 1. These flanges are provided with a pair of ports 29, 31, which, together with brake cylinder chamber 23, forms a through passage communicating with brake cylinder pipe 21 and the usual brake cylinder port of the triple valve. Gaskets 8 and 13 have ports which register with this passage.

Filler piece 9 has central apertures 32, 33 in its end faces, aperture 32 registering with an aperture 34 on the end of auxiliary reservoir 6. Gaskets 8 and 13 have central apertures to correspond. Apertures 32, 33 open into an auxiliary reservoir chamber 36 in the filler piece which, at its lower portion, communicates by way of a port 37 with auxiliary chamber 24 (see Fig. 2). Aperture 33 receives the retard stop guide 38 which has ports 39 leading to the slide valve chamber of the triple valve. Thus, the slide valve chamber of the triple valve communicates directly with the auxiliary reservoir, as usual.

It will be noted that bolt holes 17 in the filler block, as best shown in Fig. 2, are isolated from auxiliary reservoir chamber 36 and from the chamber 41 formed in the filler block. Auxiliary reservoir chamber 36 and brake cylinder chamber 23 are also isolated from chamber 41 and from each other.

Chamber 41 communicates with supplemental reservoir chamber 26 by way of a port 42. A port (not shown) leads from chamber 26 to mounting face 12 and registers with the supplemental reservoir port in the flange 14 of the triple valve. Gasket 13 is correspondingly ported.

Formed on filler piece 9 is a boss 43 having a ported face against which is mounted a flanged union connection 44 by means of studs 46 and nuts. Secured to the flanged union connection 44 is a pipe 47 which leads from the supplemental reservoir (not shown), thereby placing this reservoir in communication with chamber 41 in the filler block 9. Pipe 47 is threaded into connection 44 at 48 and secured by beveled ring 49 and nut 51. A centering bushing 52 and ring gasket 53 provide a sealed joint.

Depending portion 22 of filler block 9 is formed with a mounting face 54 on its under side which is provided with a series of openings 56, 57, 58 leading from chambers 24, 23 and 26, respectively. Secured on mounting face 54 by means of bolts 59 extending therethrough and into filler block 9 is a body 61 having a chamber 65 provided with an opening 62 on its under side. A gasket 63, ported to correspond with openings 56, 57, 58, provides a sealed joint between filler block 9 and body 61.

On its upper side, body 61 is provided with openings 64, 66 and 67, corresponding to openings 56, 57, 58, to receive check valve assemblies 68, 69 and 71 for controlling the release of air from chambers 24, 23 and 26, respectively, to the interior of body 61.

Since these valve assemblies, which are of the poppet type, are identical, it is necessary to describe only one of them. Referring particularly to Fig. 1, the valve assembly 69 is shown as including a bushing 72 formed with an enlarged upper portion located in opening 57 in the filler block and with a reduced lower portion 73 located in opening 66 in body 61. The lower end of the bushing is closed, except for a central valve guide opening 74 and a series of radial ports 76 opening into chamber 65 of body 61.

Bushing 72 is formed interiorly with an annular seat 77 on which is located a poppet-type valve having a head 78. The valve stem 79 extends through bushing 72 and is reduced and threaded at its upper end to receive a nut 81 whereby valve head 78 and its seating gasket 82 are secured thereon. Valve head 78 is formed with a grooved guide rim 83 which engages the bushing to maintain correct alignment between the valve and its seat. A coil spring 84 constantly urges the valve towards its seat. The lower end of valve stem 79 projects through guide opening 74 in the bushing. Stem 79, being smaller than the interior of the bushing, forms an annular passage 86 therewith which leads from valve seat 77 to radial ports 76. Thus, when the valve is elevated to open it against the resistance of spring 84, in a manner explained later, air in brake cylinder chamber 23 may pass freely between grooved valve rim 83 and the bushing, through the valve seat opening, and thence by way of passage 86 and radial ports 76 to the chamber 65 in body 61.

A reciprocable lifting cam shaft or member 87 for opening check valves 68, 69 and 71 is mounted in chamber 65 of body 61. Cam shaft 87 has its ends slidably mounted in suitable openings at 88 and 89 in the end walls 91, 92 of body 61. Exteriorly walls 91, 92 are formed with hollow bosses 93, 94 which are threaded to receive cap nuts 96, 97. These nuts have central openings through which the outer end portions 98, 99 of cam shaft 87 extend freely.

End portions 98, 99 of the cam shaft are reduced and thus form shoulders 101, 102 thereon. Mounted on each of the reduced ends of the cam shaft is a washer 103. A relatively light coil spring 104 interposed between each of these washers and its cap nut 96 or 97 serves to force the washer against its cam shaft shoulder 101 or 102 and thereby maintain the cam shaft in its normal, central position, as shown in Fig. 2.

Each washer 103 is adapted for sliding movement within a spring cup 106 also mounted on cam shaft 87 within hollow boss 93 or 94. Spring cup 106 is formed with an inner annular flange 107 intermediate between its ends, the internal diameter of which flange is large enough to preclude any interference with the operation of spring 104 as the cup is moved back and forth, as explained below. Flange 107 forms a seat for a relatively heavy coil spring 108, the outer end of which bears against cap nut 96 or 97, thereby yieldably holding spring cup 106 against hollow body 61. Thus, it will be clear that coil spring 108 exerts a greater force on spring cup 106 than is applied to washer 103 by the spring 104. Each washer 103 is normally spaced from flange 107 of its spring cup 106, so that cam shaft 87 may be shifted longitudinally a limited distance in either direction against the tension of only the light spring 104. However, upon further movement of shaft 87 in the same direction, washer 103 engages flange 107 of spring cup 106, and both the light spring 104 and heavy spring 108 are compressed simultaneously. This obviously sets up an increased resistance to movement of the cam shaft 87 at a definite point in its operation in either direction from the central position of Fig. 2. The purpose of this will appear later.

Cam shaft 87 is formed with three pairs of similar reversely tapered cam portions adapted to engage the stems or lifting pins 79 of valves 68, 69 and 71 and open the valves upon movement of the cam shaft in either direction. Tapered shaft portions 109, 110 function for valve 68, portions 111, 112 for valve 69, and portions 113, 114 for valve 71.

It will be noted that tapered portions 109, 110 and 111, 112, in the normal position of cam shaft 87, are equidistant from the centers of their corresponding valve stems 79. Therefore, movement of cam shaft 87 in either direction will result in the simultaneous opening of valves 68 and 69 controlling the auxiliary reservoir and brake cylinder vents, respectively. It will be noted further that cam portions 113, 114 are more abruptly tapered than are portions 109 to 112 and are spaced a somewhat greater distance from the center of stem 79 of corresponding valve 71. This causes valve 71, controlling the supplemental reservoir vent, to start opening after valves 68 and 69 have opened partially, although the complete opening of all three valves is effected simultaneously. Obviously the arrangement and form of the cam portions or surfaces on cam shaft 87 may be varied to obtain any desired sequence in the operation of valves 68, 69 and 71.

A cover 116, also secured by bolts 59, closes opening 62 on the under side of body 61, dowels 117, 118 on body 61 and corresponding holes in cover 116 serving to guide the cover into place. Cover 116 is formed on its upper face with a projection or pad 119. Pad 119 has a recess 121 on the outside of the cover and a slot 122 opening therefrom into chamber 65 of body 61. A small exhaust port 120 in pad 119 connects chamber 65 to the atmosphere. Perforated trunnion bearings 123, 124 on either side of recess 121 receive a pin 126 on which is pivoted a lever 127. A spherical extension 128 on the upper end of lever 127 projects into an annular seat 125 in a yoke 129 mounted for sliding movement on top of pad 119. Yoke 129 is forked at 131 and 132 to engage annular grooves 133, 134, respectively, on cam shaft 87.

At its lower end, lever 127 is formed with a clevis 136 provided with a removable pin 137 to which is connected a pair of oppositely extending pull rods 138, 139. These pull rods extend to any convenient points, so that the device may be operated from either side of the car.

It will be noted that in the described construction chamber 23 is in constant communication with the brake cylinder, chamber 24 is in constant communication with the auxiliary reservoir, and chamber 26 is in constant communication with the supplemental reservoir, so that, depending upon the manner in which cam shaft 87 is actuated, air may be either successively or simultaneously exhausted from these chambers.

In operation, assuming the parts are in the normal closed position of Fig. 2, when pull rod 138 is pulled to the left, lever 127 rotates in a clockwise direction. As a result, ball extension 128 moves yoke 129 and cam shaft 87 to the right until washer 103 at the right hand side of the device engages shoulder 107 on spring cup 106. Up to this point, movement of shaft 87 has been only against the resistance of the comparatively light spring 104. As explained, movement beyond this position is yieldably resisted because of the presence of the heavier spring 108.

As cam shaft 87 moves to the right, cam portions 109, 111 urge the stems 79 of valves 68 and 69 upwardly, thereby unseating these valves and allowing air to escape from chambers 24 and 23 into chamber 65 in the hollow body 61. Cam portion 113 being spaced further from stem 79 of its corresponding valve 71 has not at this time moved to the right sufficient to raise valve 71 from its seat, and, hence, no escape of air from chamber 26 takes place.

When yoke 129 moves to the right on pad 119, slot 122 is partially uncovered at the left hand end of yoke 129, thereby allowing air from chamber 65 to be vented directly to the atmosphere through a comparatively large opening, in addition to its escape through the small vent opening 120. It will be noted that when shaft 87 is moved to the right, the springs 104 and 108 at the left end of the device remain undisturbed. This is due to the seating of the washer 103 and cup 106 against hollow body 61, thereby allowing free inward movement of reduced end 98 of the cam shaft through the springs.

An important advantage in the operation of the device as described is that the increased resistance to movement of pull rod 138, caused by the presence of the relatively heavy spring 108, serves to indicate definitely to the brakeman that the brake cylinder and auxiliary reservoir volumes only are being vented and that further movement of the pull rod will cause venting of the supplemental reservoir volume.

Upon continued operation of pull rod 138 to the left, cam portions 109, 111 open valves 68, 69 further against the tension of their springs. At the same time, cam portion 113 move sufficiently to the right to engage stem 79 of valve 71 and open the valve against the tension of its spring. This permits air to be vented from chamber 26, and thence into chamber 65 and hollow body 61. In effecting the described additional movement of cam shaft 87 to the right, lever 127 continues its movement in a clockwise direction. As a result, yoke 129 uncovers a larger area of slot 122 and thereby affords a larger capacity exhaust port for air escaping from chamber 65 to the atmosphere. Upon this further movement of cam shaft 87, engagement of washer 103 with spring cup flange 107 causes heavy spring 108 to be compressed along with light spring 104. The right hand end of slot 122 forms a limiting stop for movement of yoke 129 in this direction.

Operation of the device in the opposite direction, i. e., so that cam shaft 87 moves to the left when pull rod 139 is actuated, obviously will cause valves 68, 69 and 71 to operate in the same manner as is the case when pull rod 138 is actuated. When moved in this direction, cam portions 110, 112 and 114 will function to effect the desired opening of the check valves.

When it is only necessary to provide a slight exhaust of auxiliary reservoir and brake cylinder air, pull rod 138 or 139 is moved in either direction until the additional resistance of heavy spring 108 is felt by the operator. This will cause both auxiliary reservoir and brake cylinder air to be vented to the atmosphere without disturbing the air in the supplemental reservoir volume. This is the procedure followed when bleeding off a stuck brake or when only a limited amount of auxiliary reservoir air is to be vented to the atmosphere. If the pull rod is held in this position long enough to effect an excessive exhaust of auxiliary reservoir air and to cause the triple valve to move to restricted release, the brake cylinder release valve 69, nevertheless, will have been open a sufficient period to complete the exhaust of brake cylinder air and release the brake, irrespective of the length of time the triple valve remains in restricted release position.

If it is necessary to completely drain the system of air in a very short period of time, either pull rod 138 or 139 is moved to the position where both springs 104 and 108 are compressed, and all three release valves 68, 69 and 71 are opened. This provides a quick exhaust of air from all three pressure volumes, i. e., the brake cylinder, auxiliary reservoir, and supplemental reservoir, with the result that a complete release of the brakes will be accomplished in the quickest possible time.

Figure 3:
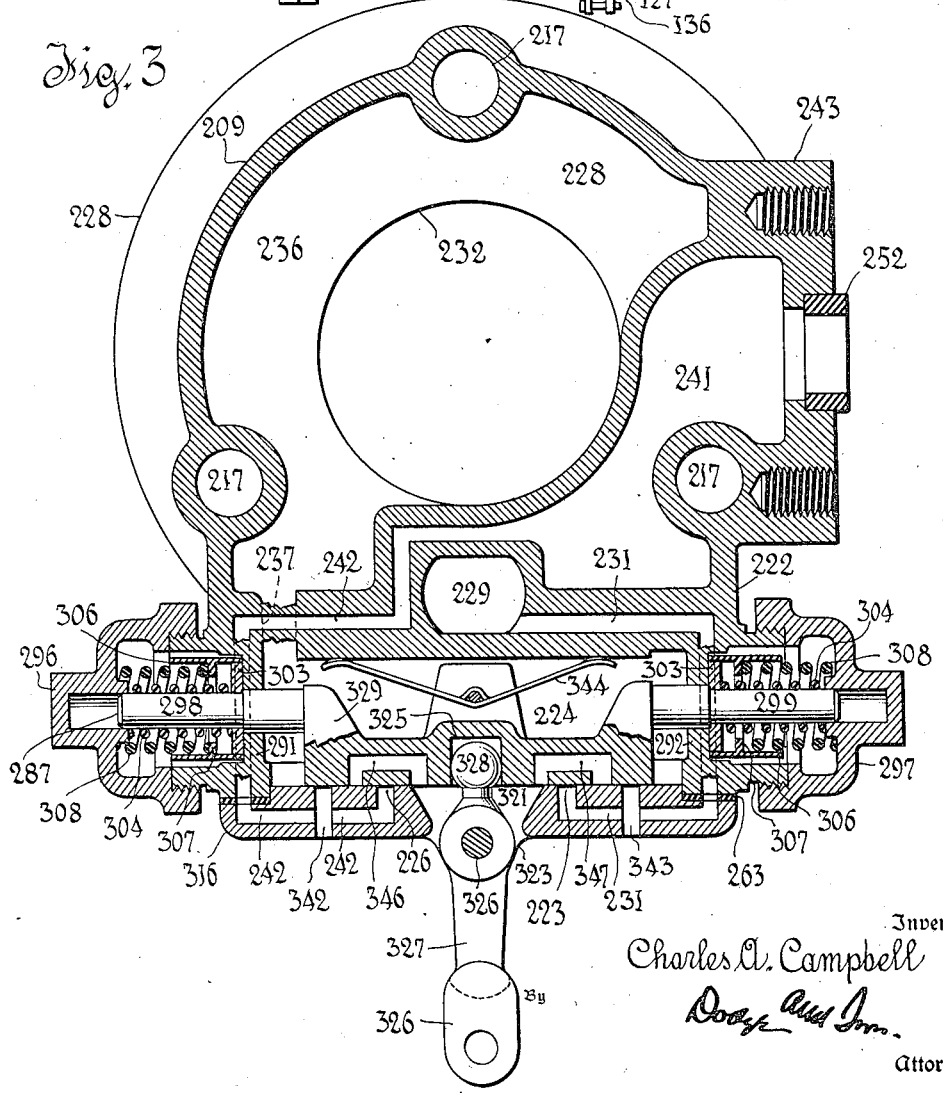
Fig. 3 is a view similar to Fig. 2 of a modified form of the release valve device, wherein use is made of a slide valve construction in lieu of the poppet valve structure of Figs. 1 and 2.

The modified device of Fig. 3 is very similar to that of Figs. 1 and 2, except that a slide valve arrangement, instead of a multiple poppet release valve, is used to control the several vent ports. Hence, the reference numerals of Figs. 1 and 2, increased by 200, will be applied to the corresponding parts of the modification.

In Fig. 3, the filler piece 209 is formed with an extension 222 having a slide valve chamber 224. The lower side of chamber 224 is closed by a combined cover and slide valve seat 316. A suitably ported gasket 263 forms a tight joint between these parts.

Filler piece 209 has a direct brake cylinder passage 229 which leads by way of a passage 231 to a slide valve seat port 223 in cover 316. Block 209 also has a supplemental reservoir chamber 241 which leads by way of a passage 242 to a supplemental reservoir seat port 226, and an auxiliary reservoir chamber 236 having a passage 237 by way of which it communicates with slide valve chamber 224. A pair of exhaust ports 342, 343 are provided in cover 316.

Cover 316 has trunnion lugs 323 carrying pin 326 on which lever 327 is pivoted. Spherical end 328 of lever 327 engages socket 325 in a slide valve 329, the valve being constantly urged against its seat by a bow spring 344.

Cover 316 has a central vent opening 321 with which registers the inner ends of a pair of inverted U-shaped passages 346, 347 in slide valve 329, when lever 327 and the slide valve are in the central, or neutral, position of Fig. 3. The various ports and passages, which, for sake of clearness, are represented diagrammatically as in a single plane, are arranged so that, in this central position of the slide valve, vent ports 342 and 343 are closed, as are also brake cylinder vent port 223 and supplemental reservoir vent port 226. Thus, there is no release of air from the brake cylinder, auxiliary reservoir or supplemental reservoir volumes.

Spring devices, similar to those at each end of cam shaft 87 in Figs. 1 and 2, are used to maintain slide valve 329 in its central position and to indicate to the operator, by the increasing resistance to movement of lever 327, the open or closed condition of the several vents. As shown, the spring devices include separate, shouldered plungers 298, 299, the inner ends of which are constantly forced against slide valve 329 by light springs 304 to maintain the valve in its central position and to urge it towards said position when removed therefrom. Plungers 298, 299 correspond to the reduced end portions 98, 99 of cam shaft 87 in Fig. 2. Heavier springs 308 normally maintain spring cups 306 against walls 291, 292.

In operation, when lever 327 is swung to the right, for example, slide valve 329 moves to the left until washer 303 on the left engages flange 307 on its spring cup 306. The arrangement of the ports and the proportioning of the parts is such that at this point vent port 343 has partially opened to allow air from the auxiliary reservoir to vent to the atmosphere by way of slide valve chamber 224. At the same time, loop passage 347 in slide valve 329 partially registers with brake cylinder port 223, thereby permitting venting of brake cylinder air to the atmosphere by way of central exhaust opening 321. Loop port 346 has not yet moved into communication with exhaust port 342 and, therefore, no venting of supplemental reservoir air takes place.

However, when lever 327 is now moved further to the right against the combined resistance of the light and heavy springs 304, 308, until slide valve 329 strikes wall 291, exhaust port 343 is fully opened and loop port 347 establishes full communication between brake cylinder seat port 223 and central exhaust opening 321. This permits full exhausting of air from both the auxiliary reservoir and brake cylinder volumes. At the same time, loop port 346 in slide valve 329 bridges supplemental reservoir seat port 226 and vent 342 to effect exhausting of supplemental reservoir air to the atmosphere. Thus, all three volumes are bled down to atmosphere.

It will be clear that the same results may be obtained by swinging lever 327 to the left and thereby moving slide valve 329 to the right. Exhaust port 342 first opens partially to vent auxiliary reservoir air to the atmosphere by way of slide valve chamber 224. Simultaneously, brake cylinder seat port 223 is placed in partial communication with exhaust opening 343 by loop port 347 on the slide valve, thereby venting the brake cylinder air to the atmosphere. Loop port 346 has not yet moved into communication with supplemental reservoir seat port 226, and hence there is no venting from the supplemental reservoir.

As slide valve 329 moves farther to the right, exhaust port 342 is fully opened and loop port 347 places brake cylinder seat port 223 in full communication with exhaust opening 343. Thus, full venting of the brake cylinder and auxiliary reservoir volumes is accomplished. At this point, loop port 346 bridges supplemental reservoir seat port 226 and central exhaust opening 321 to permit simultaneous venting of the supplemental reservoir.

Figs. 4 and 5 illustrate the application of my release device to the well known U-12-B type passenger valve. Filler block 9, in which the several release valves are located, is of the same general construction as the filler block of Figs. 1 and 2. Hence, like reference numerals are applied to corresponding parts.

In Fig. 4, 348 denotes the bracket to which are made the pipe connections leading to the brake cylinders and the various reservoir volumes, 349 is the emergency portion, and 351 indicates the high pressure portion. The safety valve cut out portion appears at 352, the quick action exhaust portion at 353, and the equalizing portion at 354.

In present constructions passages to all of the reservoirs and the brake cylinder lead only to the right hand face of bracket 348, or that face which normally contacts with equalizing portion 354. Therefore, in order to provide a multiple release valve of the character contemplated, it is necessary to mount the release valve body or filler block 9 between equalizing portion 354 and pipe bracket 348, as shown in Fig. 4.

Referring to Fig. 5, passage 356 leads to the brake cylinder. This passage is in the form of a through port leading to both faces of filler block 9 and has, branching off from it, a passage 357 which leads to release valve chamber 23. There is a second through port 358 connected to the auxiliary reservoir and it has, branching off from it, a passage 359 which leads to release valve chamber 24.

Another through port 361 in filler block 9 leads to the service reservoir. A branch passage 362 connects this passage to release valve chamber 363. Still another through port 364 leads to the emergency reservoir, while a branch passage 366 connects it to release valve chamber 26.

The construction of the release valve means and the actuating means therefor appearing in Fig. 5 is similar to that shown in Figs. 1 and 2, with the exception that, instead of three poppet valves, four poppet valves 68, 69, 71 and 363, corresponding respectively to the auxiliary reservoir, brake cylinder, emergency reservoir, and service reservoir volumes, are used. Upon the initial horizontal movement of actuator cam shaft 87, it will be seen that the brake cylinder and auxiliary reservoir volumes are reduced in pressure by the opening of check valves 68 and 69; also that upon full movement of cam shaft 87 in either direction, all four check valves 68, 69, 71 and 363 are fully opened, thereby completely draining the system of air for the purpose of moving the car without using the air brake system thereon.

While the design of the filler block and the location of the release valve means thereon to preserve present standards so far as is possible is desirable, certain advantages of the invention may be realized without adhering to the exact construction shown. Other arrangements of the release valve means are contemplated, and these and other changes obviously may be made without departing from the scope of the invention, except as the same may be limited by the appended claims.

What is claimed is:—

1. The combination with an automatic air brake mechanism, including a brake cylinder and a plurality of reservoirs, of valve means controlling vents from each of said brake cylinder and reservoirs; and a common actuator for mechanically operating said valve means.

2. The combination with an automatic air brake mechanism, including a brake cylinder and a reservoir, of valve means, including a plurality of valves, controlling vents leading from said brake cylinder and said reservoir to the atmosphere; and a common actuator for mechanically operating said valve means.

3. The combination with an automatic air brake mechanism, including a brake cylinder and a reservoir, of multiple ported slide valve means controlling separate vents leading directly from said brake cylinder and said reservoir to the atmosphere; and common actuating means for mechanically operating said valve means.

4. The combination with an automatic air brake mechanism, including a brake cylinder and a plurality of reservoirs, of multiple ported slide valve means, including a ported slide valve and a ported slide valve seat, controlling vents from each of said brake cylinder and reservoirs, said slide valve being movable from a normal position, in which all of said vents are closed, to a position in which the vents from the brake cylinder and one of said reservoirs are open, and thence to a position in which said brake cylinder and reservoir vents and another reservoir vent are open; and actuating means for the slide valve means.

5. The combination with an automatic air brake mechanism, including a brake cylinder and a reservoir, of multiple poppet valve means controlling separate vents leading directly from said brake cylinder and said reservoir to the atmosphere; and common actuating means for mechanically operating said valve means.

6. The combination with an automatic air brake mechanism including a brake cylinder and a reservoir of multiple poppet valve means controlling separate vents leading directly from said brake cylinder and said reservoir to the atmosphere, said valve means including a plurality of poppet valves corresponding to said vents; resilient means normally holding said valve closed; cam means adapted for movement to open said valves; and actuating means for said cam means.

7. The combination with an automatic air brake mechanism, including a brake cylinder and a plurality of reservoirs, of valve means controlling vents from each of said brake cylinder and reservoirs, said valve means being movable between three positions, namely, a normal position in which all of the vents are closed, a second position in which the brake cylinder vent and one of the reservoir vents are partially open, and a third position in which said brake cylinder and reservoir vents and another reservoir vent are fully open; and means for actuating the valve means.

8. The combination with an automatic air brake mechanism, including a brake cylinder, an auxiliary reservoir, and a supplemental reservoir, of valve means controlling vents from said brake cylinder and said reservoirs, said valve means comprising a plurality of poppet valves corresponding to said vents; resilient means normally holding said valves closed; a cam shaft provided with cam surfaces adapted upon axial movement of the shaft to coact with the stems of said valves and open the valves, said cam surfaces being arranged to open the valves controlling the brake cylinder and auxiliary reservoir vents first, and then to open the valve for the supplemental reservoir vent upon movement of the shaft in one direction; and means for actuating said cam shaft.

9. The combination with an automatic air brake mechanism, including a brake cylinder and a reservoir, of valve means controlling vents from said brake cylinder and said reservoir; resilient means normally holding said valve means in closed position, said valve means being operable in either of two directions to vent the brake cylinder and the reservoir; and a common actuator for mechanically operating said valve means.

10. The combination with an automatic air brake mechanism, including a brake cylinder and a reservoir, of valve means controlling vents from said brake cylinder and said reservoir, said valve means being mechanically operable in either of two directions to vent the brake cylinder and the reservoir.

11. The combination with an automatic air brake mechanism, including a brake cylinder and a plurality of reservoirs, of valve means controlling vents from said brake cylinder and said reservoirs, said valve means being movable successively between three positions, namely, a normal position in which all of the vents are closed, a second position in which the brake cylinder and one of the reservoirs are vented, and a third position in which said brake cylinder and reservoir and another reservoir are vented; relatively light, resilient means for holding said valve means in normal position; relatively heavy, resilient means resisting movement of the valve means from its second to its third position; and actuating means for said valve means.

12. The combination with an automatic air brake mechanism, including a brake cylinder and a plurality of reservoirs, of a body having separate passageways therein communicating on the one hand with a brake cylinder and a reservoir and on the other hand with a common chamber in said body; normally closed vent valves in said passageways adapted to be opened to provide communication between the passageways and said chamber; a normally closed valve controlling an exhaust port leading from said chamber to the atmosphere; and common actuating means for all of said valves.

13. A filler piece adapted for use in an automatic air brake mechanism, said filler piece comprising a body having separate passageways therein adapted to be placed in communication on the one hand with a broke cylinder and a reservoir and communicating on the other hand with a common chamber in said body; valve means located in said body for controlling venting of said passageways and said chamber to the atmosphere; and actuating means for said valve means.

14. A filler piece adapted for use in an automatic air brake mechanism, said filler piece comprising a body provided with a plurality of separate passageways therein adapted to be placed in communication at one end with a brake cylinder and a reservoir; vent valve means controlling the opposite ends of said passageways; and a common actuator for said valve means.

15. The combination with an automatic air brake mechanism, including a brake cylinder and a plurality of reservoirs, of valve means controlling separate vents leading directly from said brake cylinder and said reservoirs to the atmosphere, said valve means comprising poppet valves corresponding to said brake cylinder and reservoir vents and resilient means normally holding said valves closed; and means for actuating said valve means, said actuating means including a shiftable operating rod and cam means interposed between said rod and the valve means, the valve means being movable between three positions, namely, a normal, closed position, an operating position in which one of the reservoir vents is open, and an operating position in which both reservoir vents are open. Said brake cylinder vent being open in at least one of said operating positions.

16. In a fluid pressure brake, the combination with a brake controlling valve device, a brake cylinder and a plurality of reservoirs connected to said brake controlling valve device and normally charged with fluid under pressure, of individual valve means for said brake cylinder and for each of said reservoirs for venting fluid under pressure from said brake cylinder and said reservoirs and manual means for either operating said brake cylinder valve means and one of said reservoir valve means or said brake cylinder valve means and both of said reservoir valve means simultaneously.

17. The combination with an automatic air brake mechanism, including a brake cylinder, an auxiliary reservoir and a supplemental reservoir, of valve means controlling vents leading directly to the atmosphere from said brake cylinder and each of said reservoirs; and means for actuating said valve means, the valve means being movable between three positions, namely, a normal, closed position, a second position in which venting of the auxiliary reservoir and the brake cylinder is effected, and a third position in which venting of the brake cylinder and both the auxiliary and supplemental reservoirs is effected.

18. The combination with an automatic air brake mechanism, including a brake cylinder and a plurality of reservoirs, of valve means controlling vents leading directly to the atmosphere from said brake cylinder and each of said reservoirs; and means for actuating said valve means, the valve means being movable between three positions, namely, a normal, closed position, an operating position in which one of the reservoir vents is open, and an operating position in which both reservoir vents are open, said brake cylinder vent being open in at least one of said operating positions.

19. The combination with an automatic air brake mechanism, including a brake cylinder and a reservoir, of valve means, including a plurality of valves, controlling individual vents leading from said brake cylinder and said reservoir to the atmosphere; and a common actuator for mechanically operating said valve means, said actuator being movable to one position to operate said brake cylinder vent valve and to another position to operate said reservoir vent valve.

20. The combination with an automatic air brake mechanism, including a brake cylinder and a plurality of reservoirs, of valve means, including a plurality of valves, controlling individual vents leading from said brake cylinder and said reservoirs; and a common actuator for mechanically operating said valve means, said actuator being movable to one position to operate one of said reservoir vent valves and to another position to operate another of said reservoir vent valves and to operate said brake cylinder vent valve in one of said positions.

21. The combination with an automatic air brake mechanism, including a brake cylinder, an auxiliary reservoir and a supplemental reservoir, of valve means, including a plurality of valves, controlling individual vents leading from said brake cylinder and said reservoirs; and a common actuator for mechanically operating said valve means to vent the brake cylinder and the auxiliary reservoir first and then to vent the supplemental reservoir.

CHARLES A. CAMPBELL.